(12) United States Patent
Schirtzinger et al.

(10) Patent No.: US 10,059,057 B2
(45) Date of Patent: Aug. 28, 2018

(54) CONTINUOUS FIBER-REINFORCED COMPONENT FABRICATION

(71) Applicant: UNITED TECHNOLOGIES CORPORATION, Farmington, CT (US)

(72) Inventors: Gary A. Schirtzinger, Glastonbury, CT (US); Wendell V. Twelves, Jr., Glastonbury, CT (US); Evan Butcher, Hartford, CT (US); Lyutsia Dautova, Rocky Hill, CT (US); Joe Ott, Enfield, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 149 days.

(21) Appl. No.: 14/890,294

(22) PCT Filed: Feb. 27, 2014

(86) PCT No.: PCT/US2014/018990
§ 371 (c)(1),
(2) Date: Nov. 10, 2015

(87) PCT Pub. No.: WO2014/193505
PCT Pub. Date: Dec. 4, 2014

(65) Prior Publication Data
US 2016/0114532 A1    Apr. 28, 2016

Related U.S. Application Data

(60) Provisional application No. 61/829,719, filed on May 31, 2013.

(51) Int. Cl.
*B29C 70/30* (2006.01)
*B29C 70/34* (2006.01)
(Continued)

(52) U.S. Cl.
CPC ........ *B29C 67/0081* (2013.01); *B29C 64/106* (2017.08); *B29C 64/112* (2017.08);
(Continued)

(58) Field of Classification Search
CPC ... B29C 64/106; B29C 64/112; B29C 64/118; B29C 64/141; B29C 64/147;
(Continued)

(56) References Cited

U.S. PATENT DOCUMENTS 5,641,366 A * 6/1997 Hohman ................. B29C 70/81
                                                                                      264/258 X
5,772,938 A * 6/1998 Sharp ..................... B29C 70/32
                                                                                      264/257 X
(Continued)

FOREIGN PATENT DOCUMENTS

EP        2433780 A1      3/2012

OTHER PUBLICATIONS

International Search Report Application No. PCT/US2014/018990 dated Jun. 26, 2014.
European Search Report for Application No. EP 14 80 3585.

*Primary Examiner* — Leo B Tentoni
(74) *Attorney, Agent, or Firm* — Cantor Colburn LLP

(57) ABSTRACT

A machine for fabricating a fiber-reinforced component by additive manufacturing is disclosed. The machine may have a surface, a matrix feed configured to deposit a plurality of matrix layers on the surface, and a fiber feed configured to deposit a fiber layer on at least one of the plurality of matrix layers. The deposition of the plurality of matrix layers and the fiber layer may be controlled by a computer.

3 Claims, 4 Drawing Sheets

(51) Int. Cl.
   *B29C 70/38* (2006.01)
   *B29C 70/42* (2006.01)
   *B29C 70/68* (2006.01)
   *B29C 70/82* (2006.01)
   *B29C 67/00* (2017.01)
   *B29C 64/147* (2017.01)
   *B29C 64/106* (2017.01)
   *B29C 64/118* (2017.01)
   *B29C 64/112* (2017.01)
   *B33Y 10/00* (2015.01)
   *B33Y 30/00* (2015.01)
   *B29C 64/141* (2017.01)
   *B29C 64/165* (2017.01)

(52) U.S. Cl.
   CPC .......... *B29C 64/118* (2017.08); *B29C 64/141* (2017.08); *B29C 64/147* (2017.08); *B29C 64/165* (2017.08); *B29C 70/30* (2013.01); *B29C 70/382* (2013.01); *B29C 70/681* (2013.01); *B29C 70/682* (2013.01); *B29C 70/688* (2013.01); *B33Y 10/00* (2014.12); *B33Y 30/00* (2014.12)

(58) Field of Classification Search
   CPC ....... B29C 64/165; B29C 70/30; B29C 70/34; B29C 70/38; B29C 70/382; B29C 70/42; B29C 70/68; B29C 70/681; B29C 70/682; B29C 70/688; B29C 70/82
   USPC .... 264/250, 255, 257, 258, 259, 271.1, 279, 264/308
   See application file for complete search history.

(56) References Cited

U.S. PATENT DOCUMENTS

| | | | |
|---|---|---|---|
| 5,936,861 A | 8/1999 | Jang et al. | |
| 6,490,990 B1* | 12/2002 | Hamlyn | B29C 70/347 114/357 |
| 6,519,500 B1 | 2/2003 | White | |
| 2003/0094734 A1* | 5/2003 | Deckard | B29C 64/165 264/425 |
| 2006/0165884 A1 | 7/2006 | White et al. | |
| 2012/0258250 A1 | 10/2012 | Rodgers | |
| 2013/0056672 A1 | 3/2013 | Johnston et al. | |
| 2013/0199718 A1* | 8/2013 | Ralfs | B29C 70/386 156/267 |
| 2015/0367576 A1* | 12/2015 | Page | B29C 67/0059 264/257 |

* cited by examiner

CONTINUOUS FIBER-REINFORCED COMPONENT FABRICATION

CROSS-REFERENCE TO RELATED APPLICATION

This Application is a U.S. National Stage under 35 USC § 371 of International Patent Application No. PCT/US14/018990 filed on Feb. 27, 2014 based on U.S. Provisional Patent Application Ser. No. 61/829,719 filed on May 31, 2013.

FIELD OF DISCLOSURE

The present disclosure generally relates to a machine and method for the fabrication of a fiber-reinforced component and, more specifically, relates to a machine and method for the additive manufacturing of a fiber-reinforced component.

BACKGROUND

Additive manufacturing, or three-dimensional printing, is an increasingly employed method for fabricating commercial and industrial products. In contrast to traditional machining techniques in which resource material may be cut or drilled away from a larger input stock material and discarded, additive manufacturing requires little, if any, disposal of the resource materials that are used to fabricate the desired part. The additive manufacturing process involves the successive depositing of layers of the part on a surface according to a digital three-dimensional representation of the part stored on a computer. More specifically, the digital representation of the part is sliced into multiple horizontal cross-sections and the computer directs a connected machine to deposit layers of the desired component on the surface according to the dimensions of the sliced digital cross-sections.

In order to improve the strength and structural resilience of manufactured parts, fibers having a strength that exceeds the strength of the material(s) forming the part may be incorporated into the body of the part. By virtue of the incorporated fibers, such fiber-reinforced parts may have improved mechanical properties such as increased impact strength, tensile strength, and modulus of rigidity. The incorporated fibers may be continuous fibers, or long fibers, that may have a fiber length to diameter ratio of between about 200 to about 500 or more. The continuous fibers may include one or more types of woven or non-woven fibers such as rayon cords, fiber glass, metallic wires, aramid fibers, and several others. However, as of yet, technologies allowing the incorporation of structurally reinforcing continuous fibers into parts by additive manufacturing methods are still wanting.

Current methods for fabricating continuous fiber-reinforced parts may involve impregnating layers of the continuous fiber with a resin adhesive to form "prepregs" which may then be layered in a mold by a manual and arduous process until the desired part thickness is achieved. The layered prepregs may then be cured and solidified by subjection to heat and pressure. One additive manufacturing technique, as described in U.S. Patent Application Number 2012/0258250, forms a polymeric three-dimensional part and a polymer support structure that at least partially encapsulates the three-dimensional part. Layering of the three-dimensional part and its surrounding support structure occur simultaneously on a surface by additive manufacturing. However, the support structure does not include a continuous fiber and the support structure does not integrate into the body of the three-dimensional part. Certainly, the development of additive manufacturing technologies that allow the integration of structurally reinforcing fibers into the material(s) forming the body of the part may provide parts with superior mechanical properties, while leveraging the efficiency and ease of production of additive manufacturing processes.

Clearly, a system is needed to allow the incorporation of structurally reinforcing continuous fibers into parts by additive manufacturing.

SUMMARY OF THE DISCLOSURE

In accordance with one aspect of the present disclosure, a machine for fabricating a fiber-reinforced component by additive manufacturing is disclosed. The machine may comprise a surface, a matrix feed configured to deposit a plurality matrix layers on the surface, and a fiber feed configured to deposit a fiber layer on at least one of the plurality of matrix layers. The deposition of the plurality of matrix layers and the fiber layer may be controlled by a computer.

In another refinement, the fiber layer may comprise a continuous polymer.

In another refinement, the machine may further comprise a first energy source configured to soften any of the plurality of matrix layers.

In another refinement, the machine may further comprise a pressure source configured to press the fiber layer into a previously deposited matrix layer.

In another refinement, the pressure source may emit heated air under a pressure.

In another refinement, the machine may further comprise a second energy source configured to melt any of the plurality of the matrix layers.

In another refinement, a truck may support the matrix feed and the fiber feed.

In another refinement, the truck may further support the first energy source, the pressure source, and the second energy source.

In another refinement, the computer may be operatively associated with the truck to control the movement of the truck with respect to the surface.

In another refinement, the matrix layer may comprise one or more polymers.

In accordance with another aspect of the present disclosure, a method for fabricating a fiber-reinforced component by additive manufacture is disclosed. The method may comprise depositing a matrix layer on a surface and depositing a fiber layer on a previously deposited matrix layer. The fiber layer may comprise a continuous fiber.

In another refinement, the method may further comprise depositing a subsequent matrix layer on the fiber layer.

In another refinement, the method may further comprise embedding the fiber layer into the previously deposited matrix layer.

In another refinement, the method may further comprise fusing the previously deposited matrix layer and the subsequent matrix layer.

In another refinement, the method may be automated and controlled by a computer.

In another refinement, the matrix layer may comprise one or more polymers.

In accordance with another aspect of the present disclosure, a fiber-reinforced component fabricated by an additive manufacturing process is disclosed. The additive manufacturing process may comprise depositing a matrix layer on a surface and depositing a fiber layer on a previously deposited matrix layer. The fiber layer may comprise a continuous fiber.

In another refinement, the additive manufacturing process may further comprise depositing a subsequent matrix layer on the fiber layer.

In another refinement, the additive manufacturing process may further comprise embedding the fiber layer into the previously deposited matrix layer.

In another refinement, the additive manufacturing process may further comprise fusing the previously deposited matrix layer and the subsequent matrix layer.

In another refinement, the additive manufacturing process may be automated and controlled by a computer.

In another refinement, the matrix layer may comprise one or more polymers.

These and other aspects and features of the present disclosure will be more readily understood when read in conjunction with the accompanying drawings.

It should be understood that the drawings are not necessarily drawn to scale and that the disclosed embodiments are sometimes illustrated diagrammatically and in partial views. In certain instances, details which are not necessary for an understanding of this disclosure or which render other details difficult to perceive may have been omitted. It should be understood, of course, that this disclosure is not limited to the particular embodiments disclosed herein.

DETAILED DESCRIPTION

Figure 1:
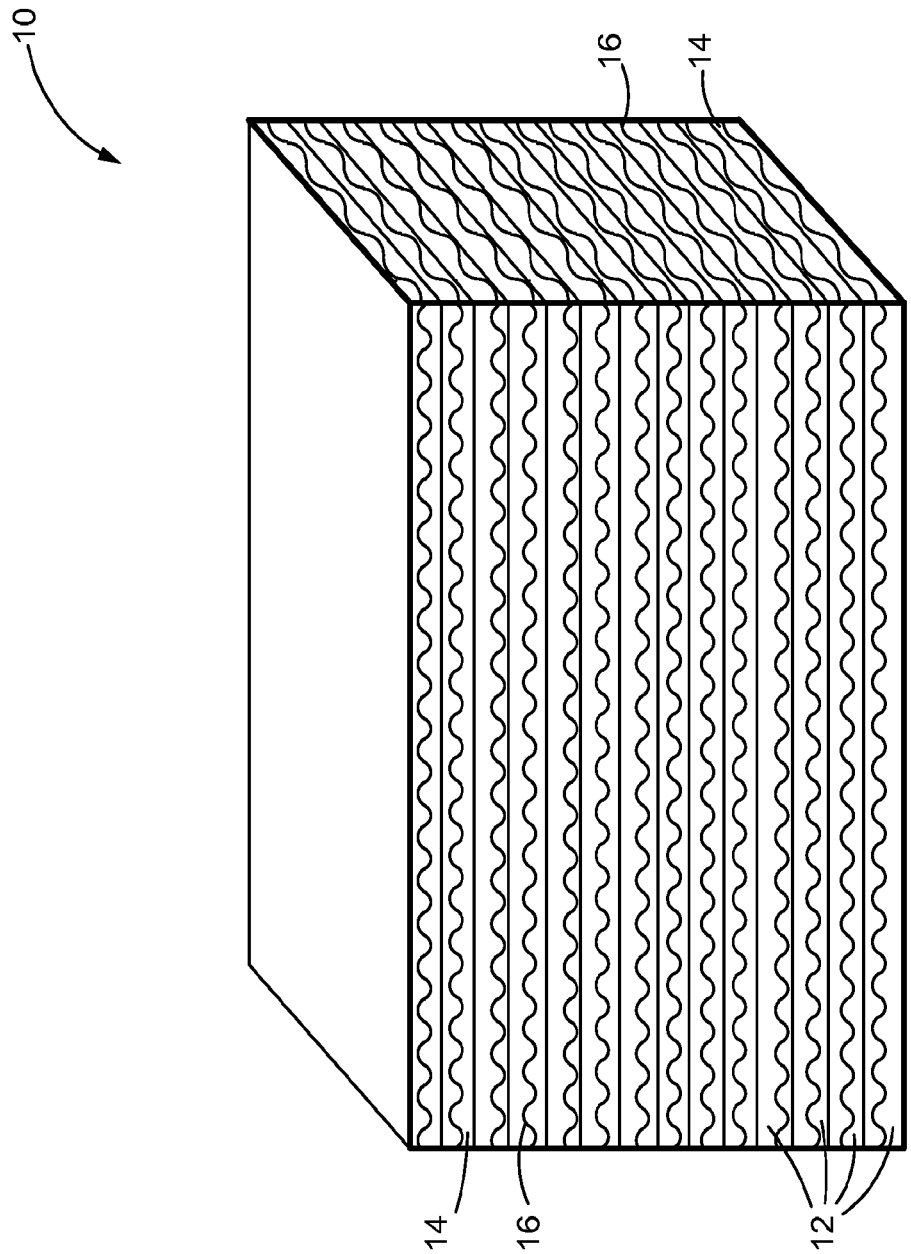
FIG. 1 is a perspective view of a fiber-reinforced component constructed in accordance with the present disclosure.

Referring now to the drawings, and with specific reference to FIG. 1, a fiber-reinforced component 10 is shown. The fiber-reinforced component 10 may be a three-dimensional structure, such as the box-like structure shown, or any other desired three-dimensional structure, whether simple or complex. In short, the fiber-reinforced component 10 may have any structure suitable for its intended use. Moreover, the fiber-reinforced component 10 may be used in a number of different applications including, but not limited to, aerospace, aircraft, and gas turbine engine applications.

The fiber-reinforced component 10 may be formed from one or more materials having one or more fibers incorporated therein to structurally reinforce the component. More specifically, the component 10 may be formed from a plurality of layers 12 in which one or more of the layers 12 may be a composite of a matrix layer 14 having one or more fiber layers 16 at least partially embedded therein, as shown. The fiber layers 16 may be introduced into the matrix layers 14 by physical force without chemical bonds being formed between the fiber layers 16 and the matrix layers 14. Alternatively, the matrix layers 14 and the fiber layers 16 may be chemically bonded to each other. Importantly, the incorporation of the fiber layers 16 into the matrix layers 14 may increase the strength and/or the rigidity of the component 10.

The matrix layer 14 may consist of one or more polymer materials, such as various types of thermoplastics, thermosetting polymers, and/or elastomeric polymers, metallic materials, and/or any other suitable material chosen by a skilled artisan. The fiber layer 16 may consist of one or more types of continuous fibers which may be long fibers having a fiber length to fiber diameter ratio of between about 200 to about 500 or more. The length of the continuous fibers may exceed about an inch. The continuous fibers may be extended, woven, or non-woven fibers in random or fixed orientations and may consist of, for example, extruded metallic wires, rayon cords, fabric fibers, glass fibers, carbon fibers, aramid fibers, basalt fibers, cellulose fibers, and/or any other continuous fiber characterized by a strength that exceeds the strength of the material(s) forming the matrix layers 14. The fiber layers 16 may also consist of short fibers alone or in combination with one or more long fibers.

Figure 2:
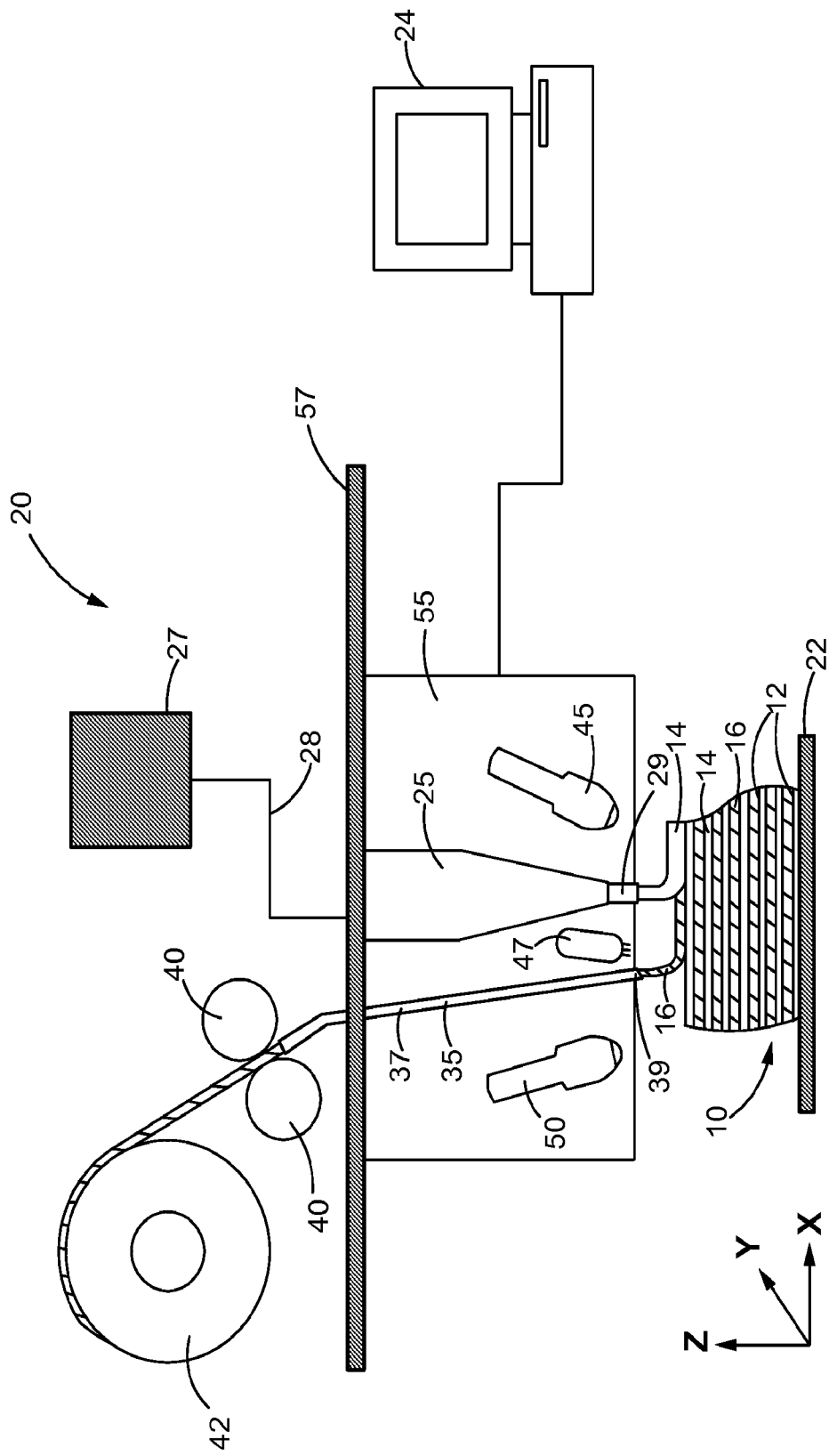
FIG. 2 is a schematic representation of a machine for the additive manufacturing of the fiber-reinforced component constructed in accordance with the present disclosure.

The fiber-reinforced component 10 may be fabricated by an additive manufacturing process in a machine 20, as shown in FIG. 2. The machine 20 may be a three-dimensional printing machine that may be adapted to allow the incorporation of the fiber layers 16 into the developing component 10. By the additive manufacturing process, the layers 12 of the component 10 may be build-up successively on a surface 22 according to a digital three-dimensional model of the component 10, such as a computer-aided design (CAD) model, contained on a host computer 24 in electrical communication with the machine 20, as shown. The computer may control the deposition of each of the layers 12 such that the additive manufacturing process may be automated. Each of the layers 12 may have a shape that directly corresponds to a shape of a sliced cross-section of the digital model of the desired component, as those of ordinary skill in the art of additive manufacturing will readily understand.

The machine 20 may have one or more matrix feeds 25 that may be configured to deposit the matrix layers 14 on the surface 22. The matrix feed 25 may draw the matrix material (s) in the form of a powder or an extruded tube from a supply source 27 that may be connected to the matrix feed 25 through a feed line 28, as shown. The matrix feed 25 may then deposit the matrix layers 14 successively on the surface 22 through a nozzle head 29. Each of the matrix layers 14 may be deposited as parallel tubes, in a zig-zag pattern, in another type of defined pattern, or in a random pattern. As explained above, each of the deposited matrix layers 14 may have a shape that matches a corresponding cross-sectional slice of the digital three-dimensional model of the component 10.

Importantly, the machine 20 may also include one or more fiber feeds 35 that may be configured to deposit one or more fiber layers 16 on any or all of the matrix layers 14 of the developing component, as shown in FIG. 2. The fiber feed 35 may have a tube 37 for depositing the fiber layers 16 through a nozzle head 39. The tube 37 may draw the fibers from rollers 40 that may pull the continuous fibers from a spool 42, as shown. Alternatively, the fiber feed 35 may draw the fibers from another type of supply source. The fiber layers 16 may be deposited on a matrix layer 14 as parallel fiber strings or in other patterns such as, for example, zig-zag patterns, random patterns, or weave patterns. Like the matrix layers 14, each of the deposited fiber layers 16 may have a shape matching a corresponding cross-sectional slice of the three-dimensional model of the component 10.

Further included in the machine 20 may be a first energy source 45 and a pressure source 47 to assist embedding the fiber layers 16 into the matrix layers 14 on which they are deposited. In particular, the first energy source 45 may be focused heat source that may heat a matrix layer 14 to a first temperature to cause the matrix layer 14 to soften to a sufficient degree to allow the fiber layer 16 deposited thereon to at least partially sink or embed into the matrix layer 14. The first temperature necessary to soften the matrix layers 14 will vary depending on the composition of the matrix layers 14. The first energy source 45 may be a laser, an electron beam, or any other suitable energy source capable of delivering sufficient heat energy to soften the matrix layer 14 to a desired degree. The pressure source 47 may be configured to apply sufficient pressure to a fiber layer 16 to press the fiber layer 16 into a matrix layer 14 on which it has been deposited after the matrix layer 14 has been appropriately softened by the first energy source 45. In this way, each of the fiber layers 16 may be at least partially embedded into the matrix layers 14 of the developing component (see further details below). The pressure source 47 may be a heated air press that may deliver a pressurized jet of heated air to the fiber layers 16 to press them into the softened matrix layers. However, other types of pressure sources may also be employed for this purpose.

The machine 20 may also have a second energy source 50 which may be a focused heat source that may heat selected matrix layers 14 to a second temperature that causes the melting and the interlayer fusion of the heated matrix layers. The second temperature necessary to cause such melting will, of course, vary depending on the composition of the matrix layers 14. After heating and melting of the selected matrix layers by the second energy source 50, the matrix layers 14 may cool and re-solidify with one or more fiber layers 16 located in between the fused matrix layers (see FIG. 4 and further details below). The second energy source 50 may be a laser or an electron beam, although other types of energy sources may also be employed. Furthermore, the second energy source 50 may deliver more heat energy to the matrix layers 14 than the first energy source 45 to in order to melt the matrix layers 14 beyond a softened state into a liquid-like state.

As shown in FIG. 2, the matrix feed 25 and the fiber feed 35 may be carried and supported by the same truck 55 to help ensure that the deposited fiber layers 16 are aligned with the deposited matrix layers 14. In addition, the truck 55 may also carry the first energy source 45, the second energy source 50, and the pressure source 47. Alternatively, each of these instruments (i.e., the matrix feed 25, the fiber feed 35, the first energy source 45, the second energy source 50, and the pressure source 47), may be supported and carried separately or in different combinations on separate trucks or support devices. Importantly, the truck 55 may be on a track 57 and may drive the horizontal movement of the matrix feed 25 and the fiber feed 35 in the x-direction and the y-direction for the deposition of each of the matrix layers 14 and each of the fiber layers 16. The truck 55 may also guide the movement of the matrix feed 25 and the fiber feed 35 vertically along the z-axis as the developing component is built. More specifically, once a matrix layer 14 and/or a fiber layer 16 is deposited in the x-direction and the y-direction, the truck 55 may be incremented upward along the z-axis to allow the matrix feed 25 and the fiber feed 35 to deposit subsequent matrix layers and/or fiber layers on previously deposited layers 12. The host computer 24 may be operatively associated with the truck to control the movement of the truck 55 with respect to the surface 22 for the deposition of the matrix layers 14 and the fiber layers 16. In addition, the truck may also drive the movement of the first energy source 45, the pressure source 47, and the second energy source 50 in order to focus the heat energy and/or pressure at specific matrix layers or fiber layers of the developing component.

Figure 3:
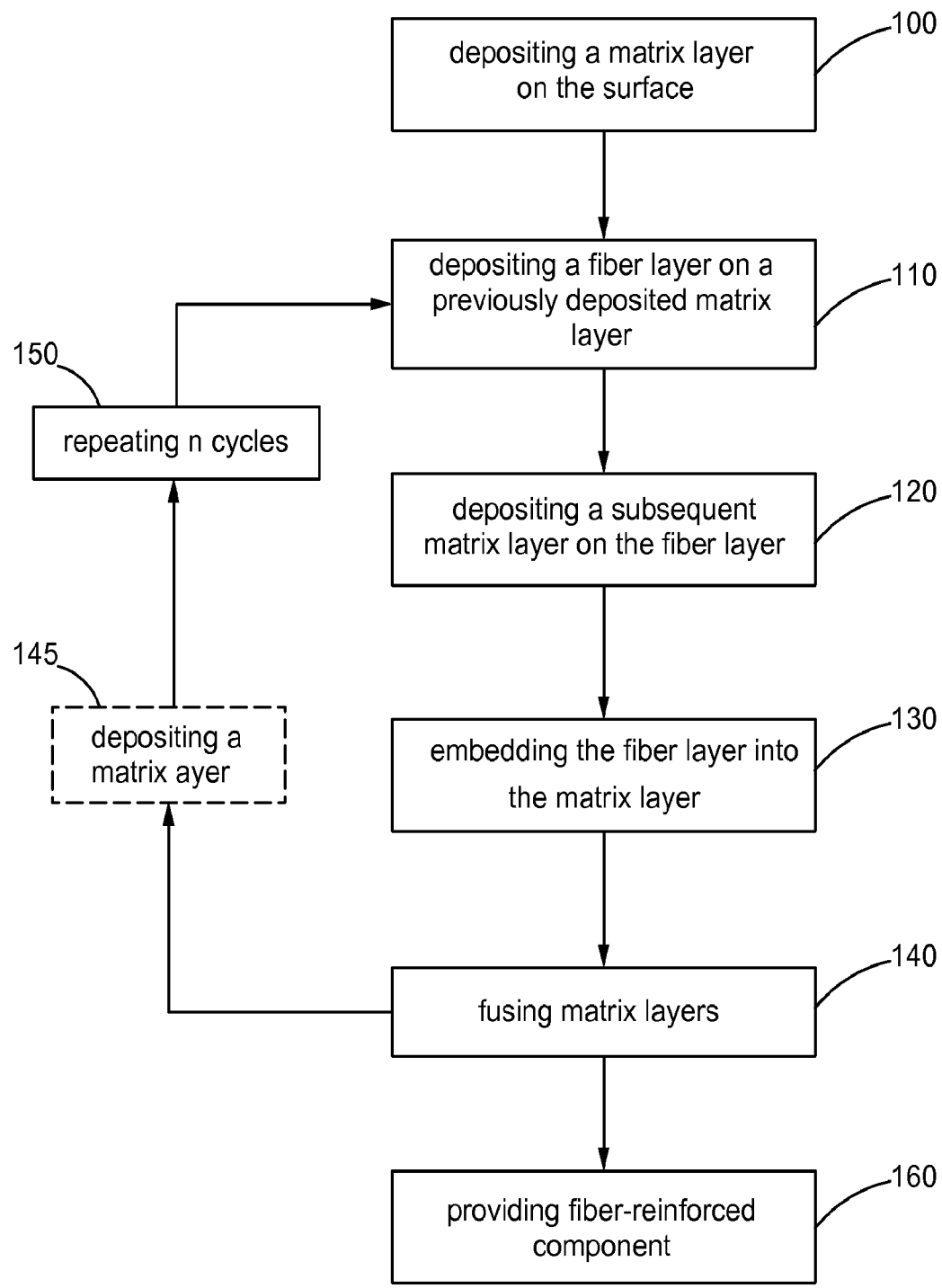
FIG. 3 is a block diagram illustrating steps involved in fabricating the fiber-reinforced component using the machine, in accordance with a method of the present disclosure.
Figure 4:
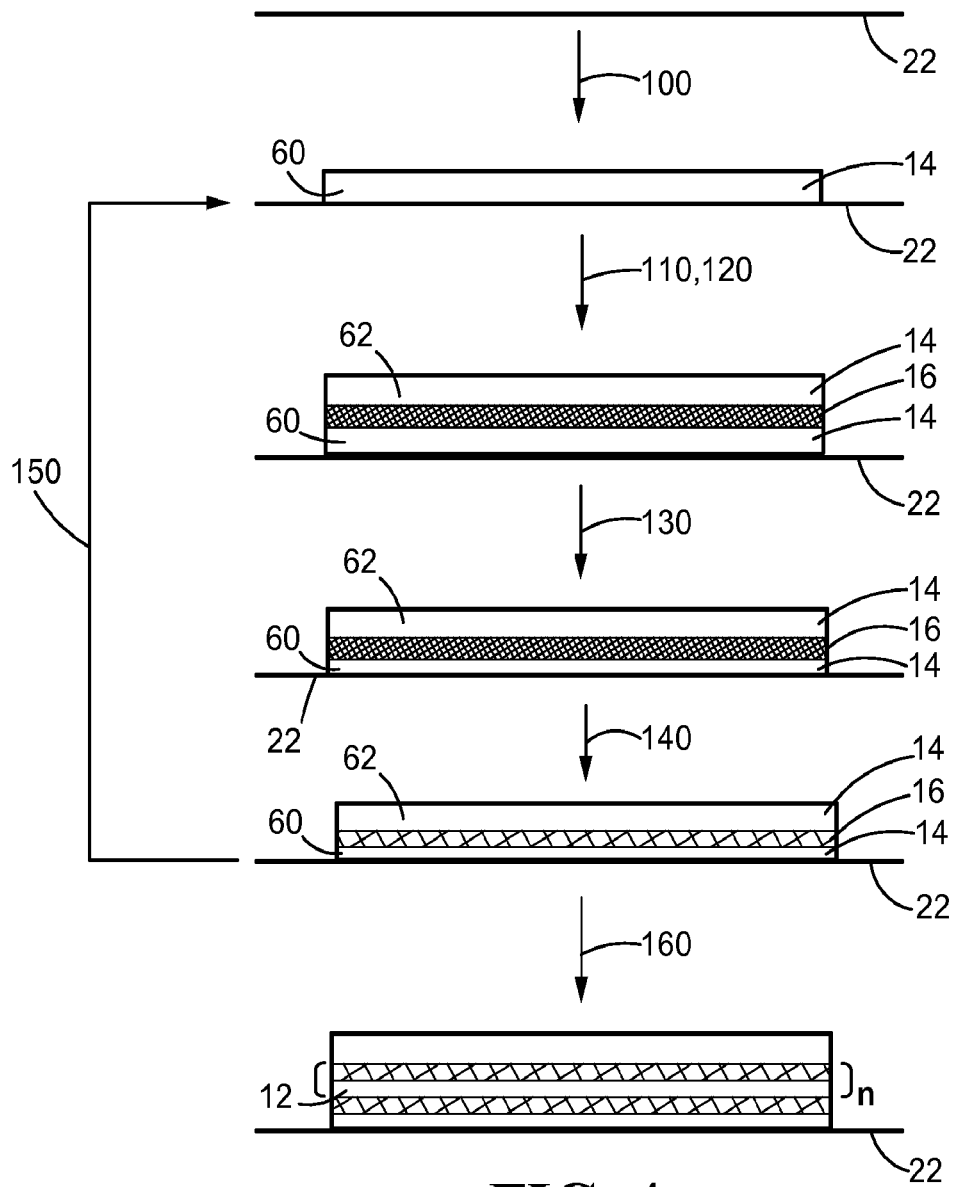
FIG. 4 is a schematic view illustrating the layer-by-layer fabrication of the fiber-reinforced component according to the method of FIG. 3.

FIGS. 3-4 illustrate a method which may be employed for the layer-by-layer fabrication of the fiber-reinforced component 10 using the machine 20. According to a first block 100, the matrix feed 25 may deposit one or more matrix layers 14 on the surface 22. According to a next block 110, the fiber feed 35 may deposit a fiber layer 16 on a previously deposited matrix layer 60 (see FIG. 4), as shown. The matrix feed 25 may then deposit a subsequent matrix layer 62 on the fiber layer 16 according to a block 120. Blocks 110 and 120 may occur simultaneously, with the fiber layer 16 and the subsequent matrix layer 62 being co-deposited, as best shown in FIG. 4. Alternatively, the deposition of the fiber layer 16 and the subsequent matrix layer 62 may occur as consecutive steps.

According to a next block 130, the fiber layer 16 may be at least partially embedded into the previously deposited matrix layer 60, as shown. The embedding of the fiber layer 16 into the previously deposited matrix layer 60 may be achieved by the operation of the first energy source 45 and the pressure source 47, as described above, or by another equivalent technique. The matrix layers 14 below and above the fiber layer 16 (i.e., the previously deposited matrix layer 60 and the subsequent matrix layer 62, respectively) may then be fused according to a block 140, as shown. The fusing of the matrix layers 14 may be achieved by the operation of the second energy source 50, as described above, in which the second energy source 50 may heat and melt the matrix layers 14 located above and below the fiber layer 16 to cause their fusion. Alternatively, fusion of the matrix layers 14 may be achieved by another equivalent technique. According to a block 150, the blocks 110, 120, 130, and 140 may then be repeated for n cycles (excluding the block 100) to build-up n layers 12 on the surface 22 until the component 10 is fully built, as best shown in FIG. 4. It is noted that prior to the start of each new cycle, one or more matrix layers 14 may optionally be deposited, as shown by an optional block 145 in FIG. 3. Following the completion of n cycles, the fiber-reinforced component 10 may be provided according to a block 160.

Notably, the fiber-reinforced component 10 may be fabricated by numerous other alternative methods that differ in one or more steps from the method illustrated in FIGS. 3-4. For example, a fiber layer 16 may first be deposited on the surface 22 rather than a matrix layer 14, multiple fiber layers 16 may be deposited to further enhance the strength of the component 10, the fiber layers 16 may be embedded into a previously deposited matrix layer 60 prior to the deposition of a subsequent matrix layer 62, the matrix layers 14 may be softened prior to the deposition of the fiber layers 16, the fiber layers 16 may be chemically bonded to the matrix layers 14 by an additional curing step, the matrix layers 14 may be fused by a curing step, and/or the fusing of the matrix layers 14 may be performed as a final step after each of the layers 12 are deposited on the surface 22. As those of ordinary skill in the art will understand, these and other variations also fall within the scope of this disclosure.

While the invention has been described with reference to certain embodiments, it will be understood by those skilled in the art that various changes may be made and equivalents may be substituted for elements thereof without departing from the scope of the invention. In addition, many modifications may be made to adapt to a particular situation or material to the teachings of the invention without departing from the essential scope of the teachings of the invention. Therefore, it is intended that the invention not be limited to the particular embodiments disclosed as the best mode contemplated for carrying out this invention, but that the invention will include all embodiments falling within the scope of the appended claims.

INDUSTRIAL APPLICABILITY

From the foregoing, it can therefore be seen that the present disclosure can find industrial applicability in many situations, including, but not limited to, the manufacture of fiber-reinforced components by additive manufacturing. The machine and method as disclosed herein allows the incorporation of structurally reinforcing continuous fibers into a component by an efficient additive manufacturing process. More specifically, the present invention provides an additive manufacturing machine having a fiber feed such that structurally reinforcing fiber layers may be layered onto matrix layers of the developing component. The present invention also provides and additive manufacturing machine having devices (i.e., the first energy source and the pressure source) that may assist embedding the structurally reinforcing fiber layers into the matrix layers of the component. The machine and method may find wide industrial applicability in a wide range of areas requiring parts with enhanced structural resilience and strength, such as aircraft and automotive industries.

What is claimed is:

1. A method for fabricating a fiber-reinforced component by additive manufacturing comprising:
   depositing a matrix layer on a surface;
   depositing a fiber layer on a previously deposited matrix layer, the fiber layer comprising a continuous fiber;
   heating the matrix layer with a first energy-source in order to soften the matrix layer; and
   pressing the fiber layer into a previously deposited matrix layer with a pressure source, wherein the pressure source emits heated air under a pressure.

2. The method, according to claim 1, further comprising depositing a subsequent matrix layer on the fiber layer.

3. The method, according to claim 1, wherein the method is automated and controlled by a computer.

* * * * *